United States Patent [19]

Tsukiji et al.

[11] Patent Number: 4,461,489
[45] Date of Patent: Jul. 24, 1984

[54] BODY FRAME WITH A LIQUID TANK SECURED INTEGRALLY THERETO FOR A MOTORCYCLE

[75] Inventors: Kensuke Tsukiji, Asaka; Yukiho Yamazaki, Higashiyamato, both of Japan

[73] Assignee: Honda Giken Kogyo Kabushiki Kaisha, Tokyo, Japan

[21] Appl. No.: 414,076

[22] Filed: Sep. 2, 1982

[30] Foreign Application Priority Data

Sep. 3, 1981 [JP] Japan .................................. 56-139150
Sep. 3, 1981 [JP] Japan .................................. 56-139151
Sep. 18, 1981 [JP] Japan .................................. 56-147047

[51] Int. Cl.³ .............................................. B60K 15/08
[52] U.S. Cl. ...................................... 280/5 A; 180/225
[58] Field of Search ............... 180/225; 280/5 A, 5 R

[56] References Cited

U.S. PATENT DOCUMENTS 906,417 12/1908 Harman ................................ 180/225
1,416,315 5/1922 Baker et al. ........................ 180/225

FOREIGN PATENT DOCUMENTS 175490 12/1952 Austria ................................ 180/225
180956 6/1922 United Kingdom ............... 280/5 A
517604 2/1940 United Kingdom ................ 180/225

Primary Examiner—John A. Pekar
Attorney, Agent, or Firm—Armstrong, Nikaido, Marmelstein & Kubovcik

[57] ABSTRACT

An improved body frame with a liquid tank secured integrally thereto for a motorcycle is disclosed which is constructed such that at least a part of the body frame is constituted of a pipe member. The improvement consists in that the liquid tank serving as an oil tank or the like is constituted by a combination of a main pipe fixedly connected to a head pipe and a gusset fixedly secured to said main pipe. The liquid tank includes a first holding chamber and a second holding chamber which are in communication with one another, said first holding chamber being defined by a combination of a part of the main pipe and the gusset, while said second holding chamber being defined by the inside space of the main pipe. Further, the liquid tank includes a defining chamber having a small holding capacity which is communication therewith, said defining chamber being equipped therein with a surface level detecting unit by means of which the surface level of liquid in the liquid tank is detected.

6 Claims, 6 Drawing Figures

BODY FRAME WITH A LIQUID TANK SECURED INTEGRALLY THERETO FOR A MOTORCYCLE

BACKGROUND OF THE INVENTION

1. Field of the Invention

The present invention relates to a body frame with a liquid tank secured integrally thereto for a motorcycle which is constructed such that the liquid tank serving as an oil tank or the like constitute of a part of the body frame.

2. Description of the Prior Art

It is hitherto known that a major part of a body frame for a motorcycle is constituted of pipe members and a liquid tank serving as an oil tank or the like is constituted by utilizing them. However, it is found that the conventional body frame of the above-described kind has drawbacks that it is difficult to ensure a sufficient holding capacity required for the liquid tank and its appearance is adversely affected by utilization of the pipe members for the body frame. Another drawback inherent to the conventional body frame for a motorcycle is that a liquid extracting port in the liquid tank becomes exposed above the surface level of liquid due to movement of liquid in the liquid tank caused by a high amplitude of vertical movements or inclinations and foreward and rearward inclination of the body frame during running of the motorcycle, resulting in air inclusion into a liquid extracting tube.

SUMMARY OF THE INVENTION

Thus, the present invention is intended to obviate the drawbacks inherent to the conventional body frame of the above-described kind.

It is an object of the present invention to provide a body frame with a liquid tank secured integrally thereto for a motorcycle which is constructed so as to ensure a sufficient holding capacity for the liquid tank, a pleasing appearance and an increased rigidity of the same.

It is other object of the present invention to provide a body frame with a liquid tank secured integrally thereto for a motorcycle which is constructed so as to ensure a sufficient holding capacity for the liquid tank without any fear of air inclusion and is simple in structure.

It is another object of the present invention to provide a body frame with a liquid tank secured integrally thereto for a motorcycle which is constructed so as to correctly detect the surface level of liquid kept in the liquid tank at all time.

The above and other objects, features and advantages of the present invention will become apparent from the reading of the following description made in conjunction with the accompanying drawings.

DETAILED DESCRIPTION OF THE PREFERRED EMBODIMENT

Now the present invention will be described in more detail with reference to the accompanying drawings which illustrate a preferred embodiment of the invention.

Figure 1:
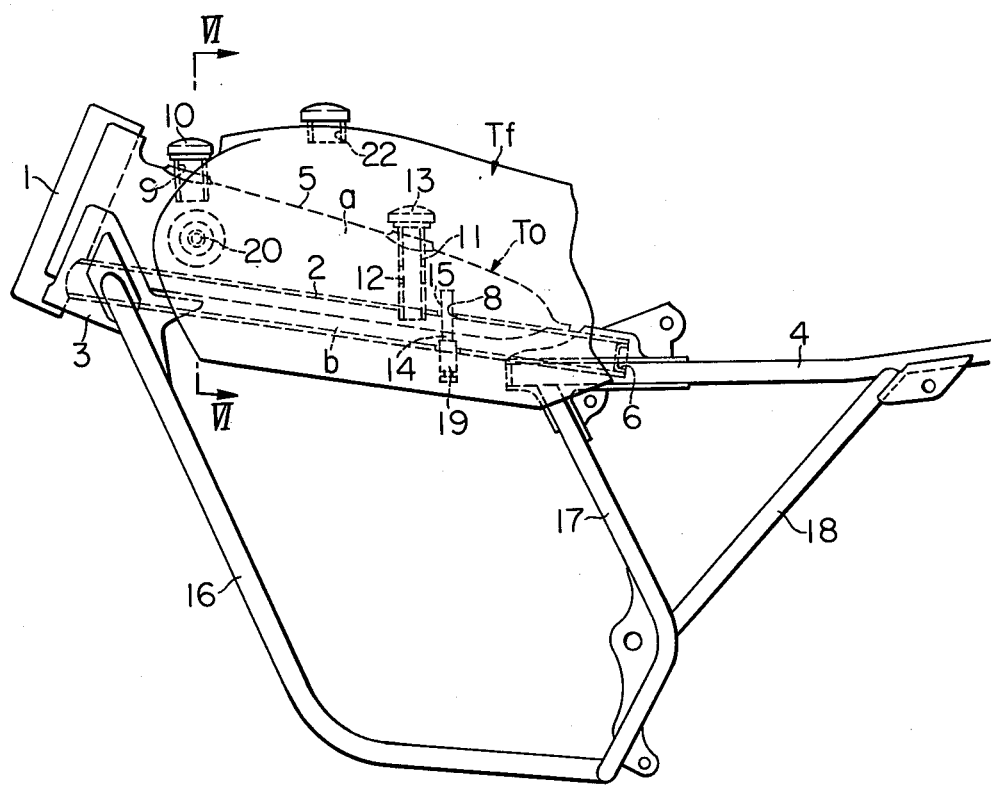
FIG. 1 is a side view of a body frame in accordance with a preferred embodiment of the present invention.

The illustrated embodiment is concerned with a cradle type body frame to which the present invention is applied. Specifically, the body frame includes a head pipe 1 through which a steering shaft (not shown) is extended and the front end of a main pipe 2 is fixedly connected to said head pipe 1 by welding. As is apparent from FIG. 1, the welded area is reinforced with a stay 3. Said main pipe 2 extends at a downward inclination in the rearward direction and the rear end of the main pipe 2 is connected to the front end of a back frame 4 by welding.

Figure 2:
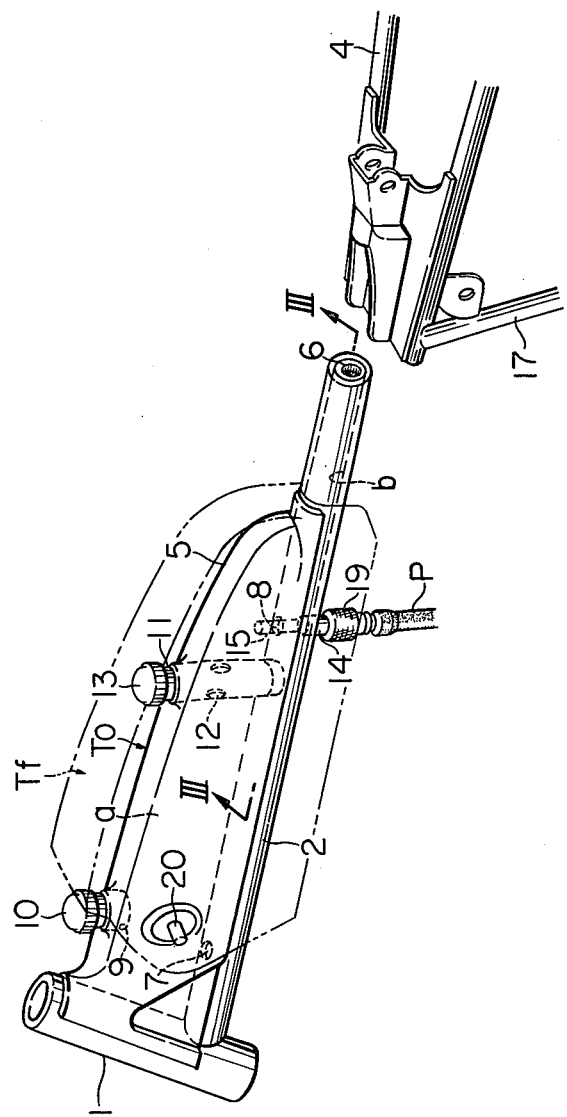
FIG. 2 is a partial perspective view of the body frame in FIG. 1, shown in a dissassembled state.

The main pipe 2 carries a gusset 5 along the longitudinally extending upper surface thereof, said gusset 5 being sealed by welding to the former. Further, the front end part of the gusset 5 is connected to the head pipe 1 and the stay 3. As best shown in FIG. 2, the gusset is a hollow member of generally inverted U-shaped cross section which is open on the bottom and at the front end. The bottom opening is sealed by the edges being welded to the main pipe and the front opening is sealed by its connection to the head pipe, forming a liquid-tight enclosure with the main pipe as the bottom and the head pipe as the front.

Thus, the head pipe 1, the main pipe 2 and the gusset 5 cooperate with one another to constitute an oil tank $T_o$ for a motorcycle. Specifically, the oil tank $T_o$ is constructed by a combination of a first closed holding chamber a and a second closed holding chamber b, wherein the first closed holding chamber a is constituted by the head pipe 1, the main pipe 2 and the gusset 5, while the second closed holding chamber b having a capacity less than that of the first closed holding chamber a is constituted by the main pipe 2, the open rear end of which is closed with a plug 6. Further, the main pipe 2 includes communication holes 7 and 8 which are located at the fore and rear upper parts of the main pipe 2 within the gusset 5 whereby the first and second holding chambers a and b are in communication with one another via said communication holes 7 and 8.

Figure 6:
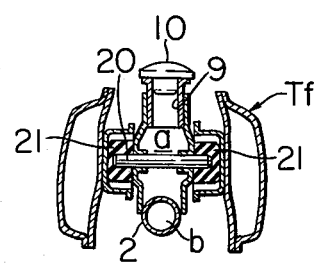
FIG. 6 is a horizontally sectioned view of the body frame taken in line VI—VI in FIG. 1.

As is apparent from FIG. 6, the gusset 5 includes a transversely extending stay 20 located at the fore part thereof, said transversely extending stay 20 reinforcing the gusset 5 and further extending outward through both the side walls of the latter to be firmly fitted into rubber mounts 21 so as to carry the fore part of a fuel tank $T_f$ mounted on the gusset 5.

Further, the gusset 5 includes an oil feed port 9 located on the upper surface thereof above the transversely extending stay 20, said oil feed port 9 being closed with an oil cap 10 so that oil is fed into the oil tank $T_o$ comprising the first and second holding chambers a and b via the oil feed port 9 with the oil cap 10 removed. When a driver disconnects the oil cap 10 and locates his eye directly above the oil feed port 9 he can see the surface level of oil kept in the oil tank $T_o$ as well as the transversely extending stay 20 so that he can easily confirm how much oil is filled therein. If the uppermost surface level of oil is predetermined to the position of the transversely extending stay 20, it will be easier to confirm that oil is fully filled in the oil tank $T_o$. It should be noted that a fuel tank $T_f$ requires no particular consideration for the oil feed port 9, provided that the latter is located between the head pipe 1 and a fuel feed port 22 of the fuel tank $T_f$ as shown in the accompanying drawings.

Figure 3:
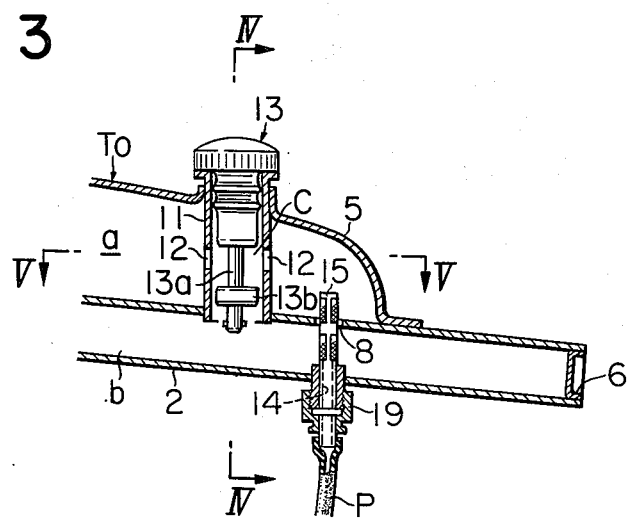
FIG. 3 is a partial vertical sectional view of the body frame taken in line III—III in FIG. 2.
Figure 4:
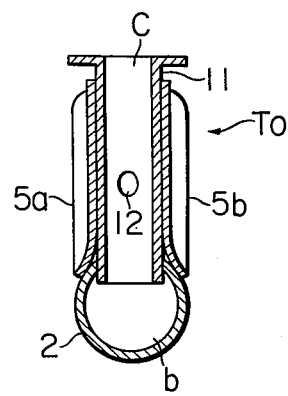
FIG. 4 is a partial sectional view taken in line IV—IV in FIG. 3.
Figure 5:
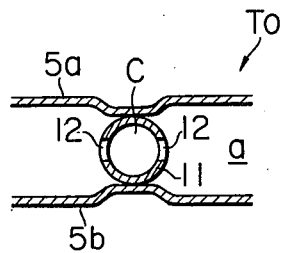
FIG. 5 is a horizontal sectional view of the body frame taken in line V—V in FIG. 3.

Further, the gusset 5 includes a defining pipe 11 at its rear part which is inserted therethrough from above. The upper end of the defining pipe 11 is secured to the upper wall of the gusset 5 by welding, as shown in FIG. 3, whereas both the side walls of the same are secured to the inner wall of both the side walls $5_a$ and $5_b$ of the gusset 5 by welding, as shown in FIGS. 4 and 5. The liquid-tight pipe 11 extends downward further through the upper wall of the main pipe 2 and is secured thereto by welding. As a result, a liquid-tight defining chamber C is formed in the first holding chamber a. It should be noted that the defining pipe 11 ensures an increased rigidity of the oil tank $T_o$ and serves also as a partition by means of which the first holding chamber a is divided into two parts, that is, the fore part and the rear part. A plurality of communicating holes 12 are provided on the inside part of the defining pipe 11 in the gusset 5 so that communication is ensured between the oil tank $T_o$ and the defining pipe 11 therethrough and thereby oil in the oil tank $T_o$ flows smoothly without any abnormal reduction of oil kept therein. Further, the defining pipe 11 is equipped with a conventional surface level detecting unit 13 which includes a float $13_b$ adapted to be vertically displaced along a detection rod $13_a$. Thus, the surface level of oil in the oil tank $T_o$ can be detected by confirming the position of the float $13_b$.

An extracting port 14 through which oil kept in the oil tank $T_o$ is discharged is provided on the bottom surface of the rear part of the main pipe 2. Said extracting port 14 is fitted with a filter 15 which extends upward through the communicating hole 8 into the first holding chamber a of the oil tank $T_o$. The lower end part of the filter 15 is firmly connected with an oil extracting tube P with the aid of a joint 19, said oil extracting tube P being in communication with an oil pump or the like means (not shown).

The head pipe 1 and the front end part of the main pipe 2 are welded to the stay 3 as mentioned above and further the upper end part of a downtube 16 is welded also to the latter. Said downtube 16 has a L-shaped curved configuration as seen from the side and extends at a downward inclination in the rearward direction until its rear end is connected by welding to the lower end of a pillar 17 to be described later.

Specifically, the upper end of the pillar 17 is connected to the front end of the back frame 4 by welding and further the pillar 17 extends downward with its lower part being appreciably bent forward so that the lower end thereof is connected to the rear end of the downtube 16 by welding.

A back stay 18 extends between the rear part of the back frame 4 and the middle part of the pillar 17 to connect them.

It should be of course understood that the oil tank $T_o$ constructed in the above-described manner may be employed as a fuel tank or the like which serves to store other kind of liquid, that the communication holes 7 and 8 may comprise a single hole or more than two holes, that the position of the communication holes should not be limited only to the fore and rear parts of the main pipe 2 and they may be located at any other suitable position, and that the gusset 5 may be welded to the bottom part of the main pipe 2.

As is well known, the normal operation of a motorcycle causes repeated large amplitude vertical movements, left and right inclinations and forward and rearward inclinations, resulting in substantial fluctuations in the surface level of oil kept in the oil tank $T_o$. However, oil kept in the defining chamber C having a small holding capacity defined by the defining pipe 11 is very little affected by any fluctuation in the surface level of oil in the oil tank $T_o$ and the surface level of the oil therein has excellent stability. Thus, the oil level detecting unit 13 in the defining chamber C ensures detection of the surface level of oil in the oil tank $T_o$ with a substantially reduced error at all times irrespective of any vertical movement, left and right inclination, and forward and rearward inclination of the body frame of the motorcycle. Particularly owing to the arrangement that the oil tank $T_o$ is designed to have a long extension along the main pipe 2 in the longitudinal direction and further to its being divided into the fore and rear chambers by means of the defining pipe 11, any fluctuation in the surface level of oil in the oil tank $T_o$ is substantially damped by means of the existence of the defining pipe 11 and thereby fluctuation in the surface level of oil in the defining chamber C is remarkably reduced whereby more reliable detection of the surface level of oil is achieved.

To sum up, the following advantageous features are provided by the body frame in accordance with the present invention.

Owing to the arrangement that a liquid tank such as oil tank $T_o$ or the like is constituted of a combination of the main pipe 2 connected to the head pipe 1 and the gusset 5 fixedly secured to the main pipe, it is ensured that the liquid tank has a sufficient holding capacity. Further, a liquid tank having an excellent high rigidity is ensured by mutual reinforcement of both the gusset 5 and the main pipe 2. Since the gusset 5 is fixedly secured to the main pipe by welding, there is no fear of adversely affecting the appearance of the motorcycle.

Further, owing to the arrangement that the liquid tank includes the first holding chamber a constituted of the main pipe 2 and the gusset 5 and the second holding chamber b comprising the inside space of the main pipe 2, said first and second holding chambers a and b being in communication with one another via the fore and rear communication holes 7 and 8, and a liquid extracting port 14 is provided on the bottom surface of the main pipe 2, it is ensured that the liquid tank has a sufficient holding capacity with very little possibility of causing wavy movement of liquid in the main pipe 2 because of viscous resistance of liquid flowing through the fore and rear communication holes 7 and 8 irrespective of any vigorous vertical movement, left and right inclination and forward and rearward inclination of the liquid tank and thereby the liquid extracting port 14 on the main pipe 2 is not exposed above the surface level of liquid, resulting in no air inclusion into liquid discharged through the liquid extracting port 14.

Furthermore, owing to the arrangement that the liquid tank includes the defining chamber C having a small holding capacity in which the surface level detecting unit 13 is incorporated for detecting the surface level of liquid, it is ensured that the surface level of liquid in the defining chamber C fluctuates very little irrespective of any high fluctuation in the surface level of liquid in the liquid tank caused by rocking movement of vibratory movement of the latter and thereby reliable surface level detection is achieved by means of the surface level detecting unit.

It should be noted that an increased rigidity is ensured for the liquid tank by providing the defining chamber C in the latter.

What is claimed is:

1. A body frame for a motorcycle, comprising:
   a head pipe;
   a main pipe fixedly connected at one end to said head pipe and extending rearwardly therefrom; and
   a hollow gusset of generally inverted U-shaped cross section open at the front and bottom, the front of said gusset being connected to said head pipe and the bottom edges of said gusset extending longitudinally along the surface of said main pipe and being sealed thereto, whereby said gusset, said head pipe and said main pipe form a liquid-tight enclosure.

2. A body frame as claimed in claim 1 wherein said liquid-tight enclosure includes a first holding chamber defined by the interior of said gusset and the upper outside surface of said main pipe and the surface of said head pipe within said gusset, and a second holding chamber defined by the inner space of said main pipe.

3. A body frame as claimed in claim 2 wherein said first and second holding chambers are in communication with one another via communication holes provided in said main pipe.

4. A body frame as claimed in claim 3 wherein said main pipe is formed with a liquid extracting port in the lower surface thereof.

5. A body frame as claimed in claim 1 or 2 wherein said liquid-tight enclosure includes within it a defining chamber having a small holding capacity which is in communication therewith, said defining chamber being equipped with a surface level detecting unit by means of which the surface level of liquid in said liquid-tight enclosure may be detected.

6. A liquid tank construction for a motorcycle frame having a generally a vertical head pipe and a generally horizontal main pipe connected to said head pipe and extending rearwardly therefrom, said tank comprising:
   A hollow gusset of generally inverted U-shaped cross section open at the front and bottom, the front opening of the said gusset being sealed to said head pipe and the bottom opening of said gusset being sealed to said main pipe to form a first holding chamber within said gusset;
   said main pipe being sealed at both ends to form a second holding chamber; and
   said main pipe having communication holes form therein between said first and second holding chambers, whereby said head pipe, said main pipe, and said gusset form a liquid-tight tank integral to said motorcycle frame.

* * * * *